F. B. Kendall,
Reciprocating Saw Mill.
Nº 17,840.      Patented July 21, 1857.
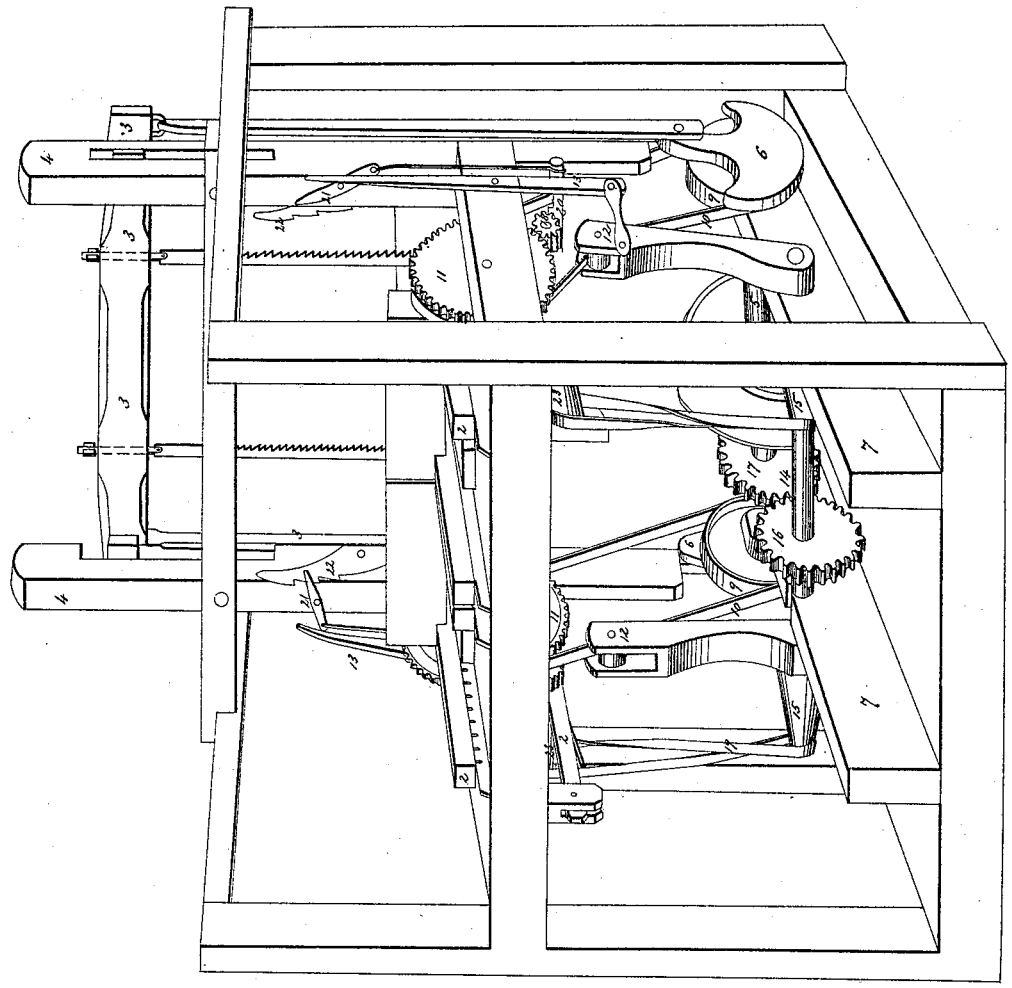

UNITED STATES PATENT OFFICE.

FRANKLIN B. KENDALL, OF BATH, MAINE.

SAWING-MILL.

Specification of Letters Patent No. 17,840, dated July 21, 1857.

*To all whom it may concern:*

Be it known that I, FRANKLIN B. KENDALL, of Bath, in the county of Sagadahoc and State of Maine, have invented a new and useful Improvement in the Method of Combining and Constructing a Double Sawmill, whereby more than 40 per cent is saved in the expense in building and 33 per cent is saved in the power required to carry the same.

The general construction of the moving machinery, &c., may be seen in the drawings.

The space required for the running gears should be about $8\frac{1}{2}$ ft. for the carriages, and 9 ft. for the inside of the saw sash, and $10\frac{1}{2}$ ft. for the outside of the fender posts, but these dimensions may vary according to the circumstances, the width of the mill house to be governed also to circumstances. For the moving power, (if a water mill) a single perpendicular wheel may be used adjusted to run under the crank shaft and meshing into the same by means of a bevel gear, the crankshaft being always of a length in this case to admit of sufficient room for the gears, and there being a balance crank 6 6 on each end of the shaft so that there is sufficient weight to overcome any sudden action of the gears. The crankshaft 5 being hung upon its bearings and placed upon plumb-blocks 7 7 beneath the saw sash and power applied to drive the same, reciprocating motion is communicated to the saw sash by means of the two cranks and side sweeps 8 8. A drum 9 9 upon each crank communicates motion by means of a band 10, 10 leading from the cranks on to the feed wheels 11, 11. A pulley 12, 12 with a mesh start 13, 13 attached to tighten and slack the band constitutes the movements to carry back the carriages.

A feed shaft 14 for feeding both carriage sets, with two conical turned pulleys 15, 15 and an eccentric gear 16 fixed upon it, which meshes into, and receives its motion from an eccentric 17 upon the crankshaft; these eccentrics to be adjusted to each other so that the slackest side of the one on the crankshaft shall be meshed into the fullest side of the one on the feed shaft when the crank is at its lowest center.

In mills where the carriages are fed by an even motion the log is moved against the saw while the crank is passing its lower center, that in proportion to the whole stroke of the saw three times as much feed is crowded against the saw at that point and at the instant of rising the saw must be lifted against the pressure of feed moved upon it at that time, and if in attempting to obviate against the difficulty by overhanging the saw a considerable part of the whole stroke of the saw is lost; thus may be seen the necessity of the eccentrics to move the carriages, so that the greatest amount of feed may take place while the saw is rising; and the least amount while the saw is passing the lower center.

In this mill, I use two carriage wheels 11, 11 about 4 ft. diameter with a rim of fine cast-iron teeth on the outer edge to work in connection with a small pinion 18, 18 and shaft and conical turned pulley 23 for feeding the carriages; said conical pulley shaft, and pinion, are moved by a band 19, 19 from the conical pulley 15 on the feed shaft 14. The pulley is hung near the pinion on a bridge tree 20 that may be raised and lowered in and out of gear by means of a latch 21 on the fender posts, and the trip 22 at the side of the same.

The object of the above-described improvements is to produce a simple, cheap and easily constructed double sawmill in a manner to occupy but little more space than a common single mill, and it is here claimed that by widening the saw sash 3 and combining the devices for operating carriages independently through the same, that it so far improves the building and lessens the cost of the same, and greatly diminishes the amount of power necessary to saw a given amount that by adopting the above improvement not above 8 per cent. will be added to the cost over the old way of building a single mill; that the same facilities for sawing dimensions, and other kinds of lumber is equal to the old way of sawing, and with the superior advantage in being able to saw double the amount, and giving labor to more men; that the convenience of more men together to do extra heavy lifting will be seen, which is often times too hard for a single crew.

The general construction of this mill as herein shown and described consisting of a wide saw sash 3 and two independent carriages operating through the same with appropriate fixtures of feed and carry back works in connection with each carriage, so, that either carriage and saw may be worked as independently as if the other was not there, the only disadvantage being in loading and unloading, these carriages, which may be done by loading the off carriage when the inside carriage is fed up, and unloading the inside carriage when the off one is fed up; but in gang sawing the log may be sided and squared and then turned over to the other carriage for finishing.

The logs to be sawed in this as in other mills, may be rolled in at the side, or drawn up a slip and stopped at the side of the carriages, to be ready for sawing. Now the labor considered in itself in loading or sawing with either one or the other of these carriages is the same, only the log will have to be rolled some four feet to reach the off carriage (adjustable bars being laid for the purpose) and in doing this the log is so much nearer the cantout or lumber pile when manufactured; so that if there is an inconvenience in one form, there is an advantage in another to make up for it.

I do not claim any of the several separate devices or their secondary combinations, but I do claim—

The general arrangement thereof for the purposes shown and described.

FRANKLIN B. KENDALL

Witnesses:
AMMI R. MITCHELL,
C. D. ELMER.